United States Patent
Hu

(10) Patent No.: US 8,225,113 B2
(45) Date of Patent: *Jul. 17, 2012

(54) COMPUTER SYSTEM WITH RESISTOR-CAPACITOR FILTER CIRCUIT

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 401 days.

This patent is subject to a terminal disclaimer.

(21) Appl. No.: 12/579,250

(22) Filed: Oct. 14, 2009

(65) Prior Publication Data

US 2010/0327991 A1 Dec. 30, 2010

(30) Foreign Application Priority Data

Jun. 25, 2009 (CN) .......................... 2009 1 0303662

(51) Int. Cl.
  *G06F 1/26* (2006.01)

(52) U.S. Cl. ........................ 713/300; 307/105; 333/172

(58) Field of Classification Search .................... 307/43, 307/105, 42; 333/172; 713/300
See application file for complete search history.

(56) References Cited

U.S. PATENT DOCUMENTS

| 6,906,433 B2* | 6/2005 | Nguyen | 307/31 |
| 8,008,803 B2* | 8/2011 | Hu | 307/42 |
| 2006/0200689 A1* | 9/2006 | Lin et al. | 713/300 |

* cited by examiner

*Primary Examiner* — Albert Wang
(74) *Attorney, Agent, or Firm* — Altis Law Group, Inc.

(57) ABSTRACT

A computer system includes a north bridge chip, a power source, and a resistor-capacitor filter circuit coupled between the power source and the north bridge chip. The north bridge chip has a digital-to-analog converter analog power pin and a digital-to-analog converter analog ground pin. The power source is coupled to the digital-to-analog converter analog power pin of the north bridge chip. The resistor-capacitor filter includes a first resistor and a first capacitor. The first resistor is connected between the power source and the digital-to-analog converter analog power pin of the north bridge chip. One end of the first capacitor is connected to the digital-to-analog converter analog power pin of the north bridge chip, and another end of the first capacitor is connected to ground together with the digital-to-analog converter analog ground pin of the north bridge chip.

19 Claims, 3 Drawing Sheets

COMPUTER SYSTEM WITH RESISTOR-CAPACITOR FILTER CIRCUIT

BACKGROUND

1. Technical Field

The present disclosure relates to a computer system with a resistor-capacitor filter circuit for decreasing a voltage ripple of a power source that supplies electronic power to a north bridge chip.

2. Description of Related Art

Referring to FIG. 3, a computer system includes a central processing unit (CPU), a north bridge chip, and a south bridge chip. The north bridge chip, also known as a memory controller hub (MCH) or an integrated memory controller (IMC), is one of the two chips in the core logic chipset on a computer's motherboard. The north bridge chip is capable of communicating with the CPU and controlling interaction with memory, the Peripheral Component Interconnect (PCI) bus, Level 2 cache, and all Accelerated Graphics Port (AGP) activities.

The north bridge chip plays an important role, and a power supply with less voltage ripple supplying electric power thereto is also important. However, the typical power supply circuit generates large amounts of ripple voltage which deteriorate the north bridge chip's performance. There is a room for improvement in the art to decrease the ripple voltage.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
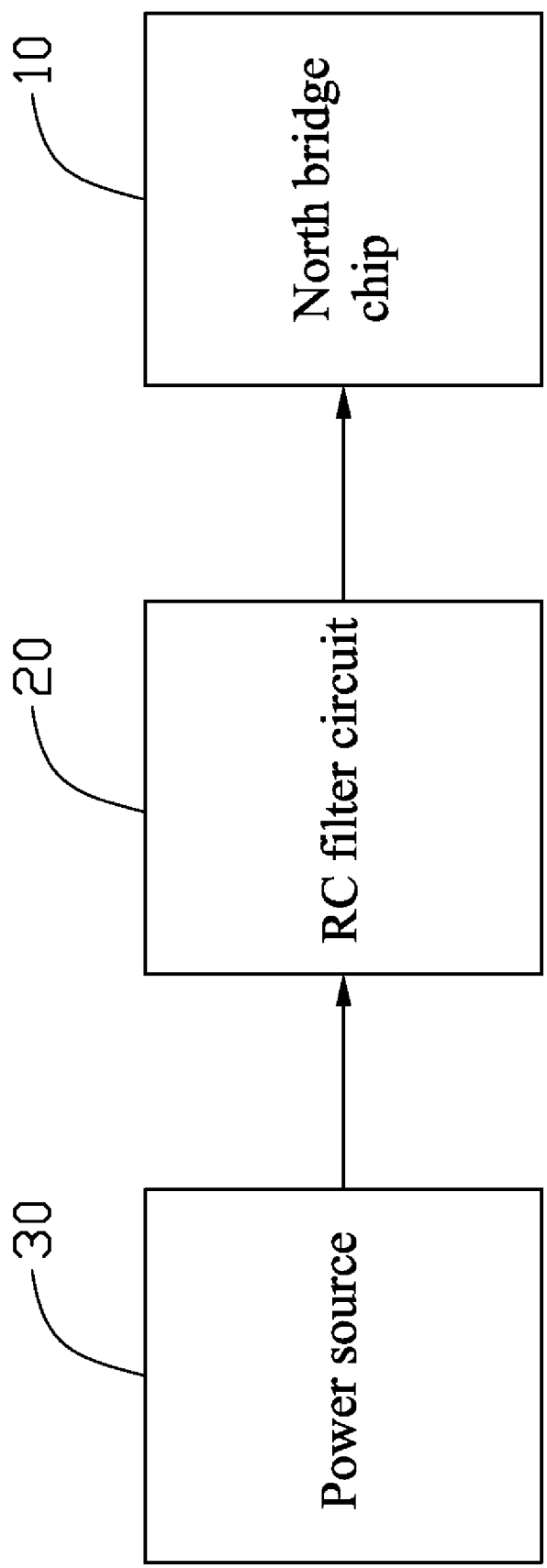
FIG. 1 is a block diagram of a computer system with a resistor-capacitor filter circuit according to one embodiment.

Referring to FIG. 1, a computer system includes a North bridge chip 10, a power source 30, and a resistor-capacitor (RC) filter circuit 20 coupled between the power source 30 and the north bridge chip 10. The power source 30 is capable of generating and sending power signals (including a 1.8V_SYS power) to the north bridge chip 10. The RC filter circuit 20 is used to filter the power signal fed to the north bridge chip 10.

Figure 2:
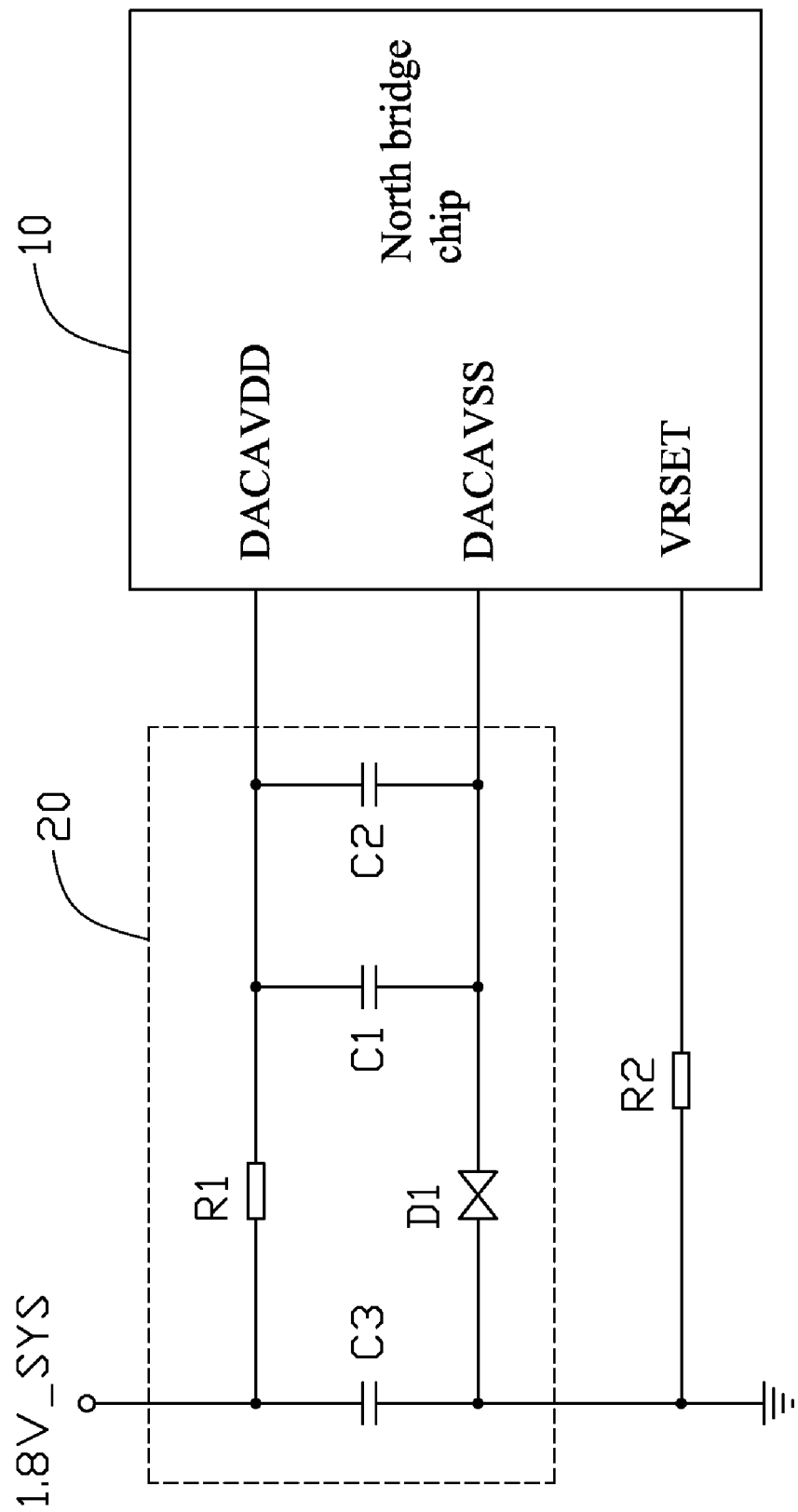
FIG. 2 illustrates a circuit diagram of the resistor-capacitor filter circuit of FIG. 1.
Figure 3:
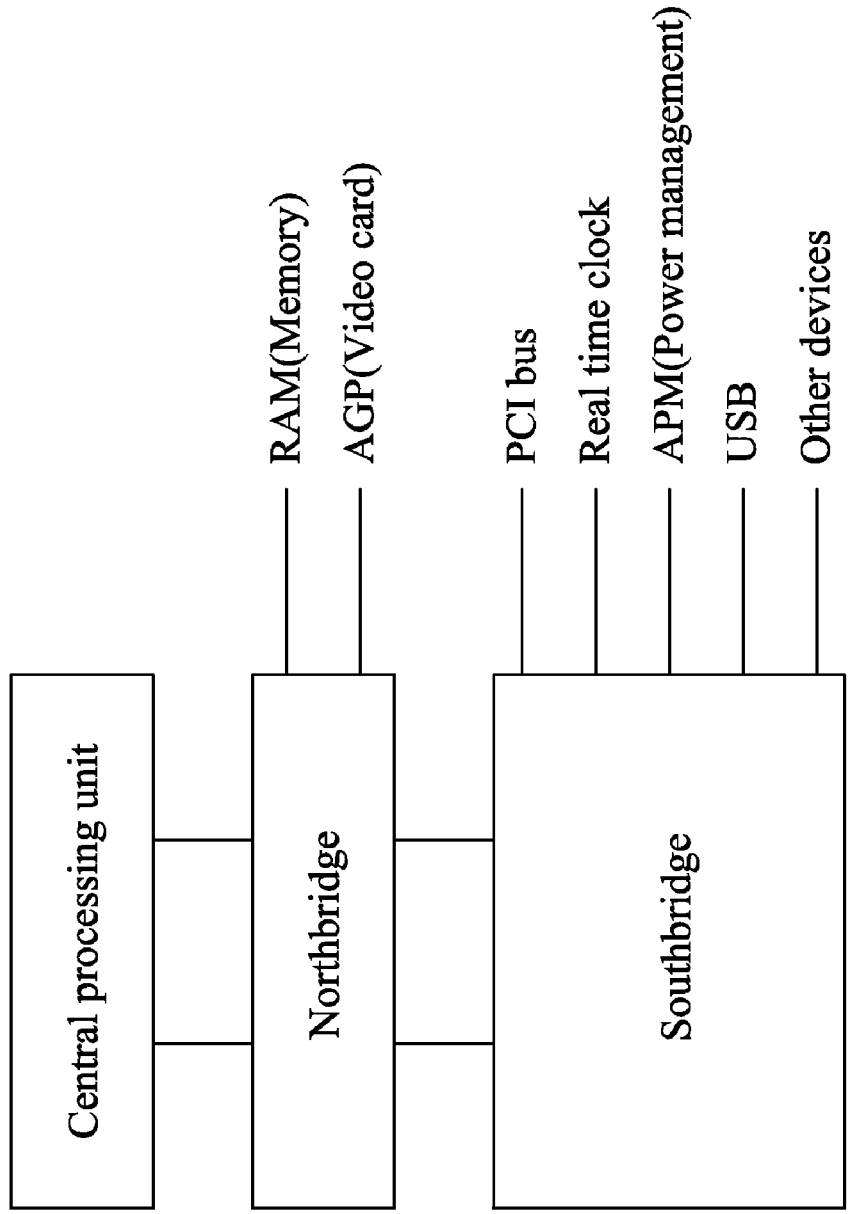
FIG. 3 illustrates a computer system with a north bridge chip and south bridge chip according to the prior art.

Referring to FIG. 2, the north bridge chip 10 includes a digital-to-analog converter analog power (DACAVDD) pin, a digital-to-analog converter analog ground (DACAVSS) pin, and a reset (VRSET) pin.

The RC filter circuit 20 includes a first resistor R1, a first capacitor C1, a second capacitor C2, a third capacitor C3 and a copper foil D1. The DACAVDD pin of the north bridge chip 10 is configured to receive the 1.8_SYS power signal generated from the power source 30. The first resistor R1 is coupled between the 1.8_SYS power and the DACAVDD pin of the north bridge chip 10. The first capacitor C1 and the second capacitor C2 are connected in parallel between the DACAVDD pin and the DACAVSS pin of the north bridge chip 10. One end of the third capacitor C3 is coupled to the 1.8V_SYS power signal, and another end of the third capacitor C3 is connected to ground. The copper foil D1 is connected between ground terminals of the first capacitor C1 and the third capacitor C3. The copper foil D1 is used to reserve space allowing an electronic component (such as a resistor, a capacitor, or an inductor) being installed thereto. The copper foil D1 can function as an electrically conductive wire if there is no component installed thereto. The VRSET pin of the north bridge chip 10 is connected to ground via a second resistor R2.

When the power source 30 is powered up, the power source 30 generates the 1.8V_SYS power signal. The third capacitor C3 is capable of decreasing any voltage ripple of the power signal fed to the first resistor R1. The decreased ripple voltage falls across the first resistor R1 and then is further decreased by the first capacitor C1 and the second capacitor C2, thereby providing a relatively smoother power signal to the DACAVDD pin of the north bridge chip 10.

As known to those skilled in the art, a resistance value of the first resistor R1 and capacitance values of the capacitors C1, C2, C3 are importance factors in decreasing the ripple. The greater the resistance of the first resistor R1 and the greater the capacitance of the capacitors C1, C2, C3, the greater the reduction in voltage ripple that is achieved. However, if the resistance of the first resistor R1 is too great the voltage drop across the first resistor R1 will be increased, causing the voltage to the DACAVDD pin of the north bridge chip 10 to be lower than required. If the capacitance values of the capacitors C1, C2, C3 are too great, more space will be occupied because of the larger sizes of the capacitors. Thus, it's important to determine the proper resistance of the first resistor R1 and capacitance of the capacitors C1, C2, C3 to achieve the goal of reducing ripple voltage while maintaining other requirements.

In the embodiment, following values were chosen through experimentation, the resistance of the first resistor R1 is 3.3 ohms (±1%). The capacitance of the first capacitor C1 is about 0.1 uF. The capacitance of the second capacitor C2 is about 10 nF. The capacitance of the third capacitor C3 is about 4.7 uF. Resistance of the second resistor R2 is 130 ohms (±1%).

Using an oscillograph to test the voltage signal at the DACAVDD pin of the north bridge chip 10, a maximum amplitude of the ripple in the voltage signal is 30.35 mV, which is lower than that in the typical power supply circuit and so is in an allowable range.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer system, comprising:
   a north bridge chip with a digital-to-analog converter analog power pin and a digital-to-analog converter analog ground pin;

a power source coupled to the digital-to-analog converter analog power pin of the north bridge chip; and a resistor-capacitor filter circuit coupled between the power source and the north bridge chip, the resistor-capacitor filter circuit comprising a first resistor and a first capacitor, the first resistor connected between the power source and the digital-to-analog converter analog power pin of the north bridge chip, one end of the first capacitor connected to the digital-to-analog converter analog power pin of the north bridge chip, another end of the first capacitor connected to ground together with the digital-to-analog converter analog ground pin of the north bridge chip.

2. The computer system of claim 1, wherein the resistor-capacitor filter circuit further comprises a second capacitor, the first capacitor and the second capacitor are connected in parallel, each of the first capacitor and the second capacitor is connected between the digital-to-analog converter analog power pin of the north bridge chip and the digital-to-analog converter analog ground pin of the north bridge chip.

3. The computer system of claim 2, wherein a capacitance value of the first capacitor is about 0.1 uF.

4. The computer system of claim 2, wherein a capacitance value of the second capacitor is about 10 nF.

5. The computer system of claim 1, wherein resistor-capacitor filter circuit further comprises a third capacitor, one end of the third capacitor is connected to the power source, and another end of the third capacitor is connected to ground.

6. The computer system of claim 4, wherein the filter circuit further comprises a copper foil, the copper foil is connected between ground terminals of the first capacitor and the third capacitor.

7. The computer system of claim 6, wherein a capacitance value of the third capacitor is about 4.7 uF.

8. The computer system of claim 1, wherein a resistance value of the first resistor is about 3.3 ohms.

9. The computer system of claim 1, wherein one end of a second resistor is connected to a reset pin of the north bridge chip, another end of the second resistor is connected to ground.

10. The computer system of claim 9, wherein a resistance value of the second resistor is about 130 ohms.

11. A circuit comprising:
a north bridge chip comprising a digital-to-analog converter analog power pin;
a first resistor;
a first capacitor; and
a second capacitor;
wherein the first resistor is connected between a power input connection and the digital-to-analog converter analog power pin of the north bridge chip, each of the first capacitor and the second capacitor is connected between the digital-to-analog converter analog power pin of the north bridge chip and a ground terminal.

12. The circuit of claim 11, wherein a capacitance value of the first capacitor is about 0.1 uF.

13. The circuit of claim 11, wherein a capacitance value of the second capacitor is about 10 nF.

14. The circuit of claim 11, wherein resistor-capacitor filter circuit further comprises a third capacitor, one end of the third capacitor is connected to the power input connection, and another end of the third capacitor is connected to ground.

15. The circuit of claim 14, wherein the filter circuit further comprises a copper foil, the copper foil is connected between ground terminals of the first capacitor and the third capacitor.

16. The circuit of claim 14, wherein a capacitance value of the third capacitor is about 4.7 uF.

17. The circuit of claim 11, wherein a resistance value of the first resistor is about 3.3 ohms.

18. The circuit of claim 11, wherein one end of a second resistor is connected to a reset pin of the north bridge chip, another end of the second resistor is connected to ground.

19. The circuit of claim 18, wherein a resistance value of the second resistor is about 130 ohms.

* * * * *